(12) United States Patent
Szczepanski

(10) Patent No.: US 10,392,982 B2
(45) Date of Patent: Aug. 27, 2019

(54) EMISSIONS CONTROL SUBSTRATE

(71) Applicant: DENSO International America, Inc., Southfield, MI (US)

(72) Inventor: Edward Szczepanski, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 277 days.

(21) Appl. No.: 15/013,578

(22) Filed: Feb. 2, 2016

(65) Prior Publication Data

US 2017/0218810 A1    Aug. 3, 2017

(51) Int. Cl.
| | | |
|---|---|---|
| *F01N 3/20* | (2006.01) | |
| *B01D 53/94* | (2006.01) | |
| *F23J 15/08* | (2006.01) | |
| *F01N 9/00* | (2006.01) | |
| *F01N 3/027* | (2006.01) | |

(52) U.S. Cl.
CPC ....... *F01N 3/2006* (2013.01); *B01D 53/9495* (2013.01); *F01N 3/027* (2013.01); *F01N 9/002* (2013.01); *F23J 15/08* (2013.01); *B01D 2255/1021* (2013.01); *B01D 2255/1023* (2013.01); *B01D 2255/1025* (2013.01); *F01N 2240/16* (2013.01)

(58) Field of Classification Search
CPC .... F01N 2240/16; F01N 3/027; F01N 3/2006; F01N 9/002; F01N 53/9495; B01D 2255/1021; B01D 2255/1023; B01D 2255/1025; F23J 15/08

USPC .............................................. 60/300, 303, 311
See application file for complete search history.

(56) References Cited

U.S. PATENT DOCUMENTS

| | | | | |
|---|---|---|---|---|
| 4,505,107 A | * | 3/1985 | Yamaguchi | F01N 3/027 55/283 |
| 5,261,230 A | * | 11/1993 | Yuuki | F01N 3/2013 123/691 |
| 5,297,050 A | * | 3/1994 | Ichimura | G01C 21/28 340/989 |
| 5,323,868 A | * | 6/1994 | Kawashima | B60K 6/46 180/65.245 |
| 8,205,439 B2 | * | 6/2012 | Gonze | F01N 3/027 60/286 |
| 2004/0221572 A1 | * | 11/2004 | Treiber | B01D 46/0063 60/297 |
| 2012/0076699 A1 | * | 3/2012 | Ishihara | B01J 19/2485 422/174 |

FOREIGN PATENT DOCUMENTS

| | | | |
|---|---|---|---|
| JP | 2964120 | * | 10/1999 |
| JP | 2000154712 A | | 6/2000 |
| JP | 2010024923 A | | 2/2010 |

* cited by examiner

*Primary Examiner* — Phutthiwat Wongwian
*Assistant Examiner* — Diem T Tran
(74) *Attorney, Agent, or Firm* — Harness, Dickey & Pierce, P.L.C.

(57) ABSTRACT

Emissions control assemblies including substrates defining a plurality of channels that are configured to receive engine exhaust passing through the substrates, and heating elements configured to heat the substrates.

9 Claims, 8 Drawing Sheets

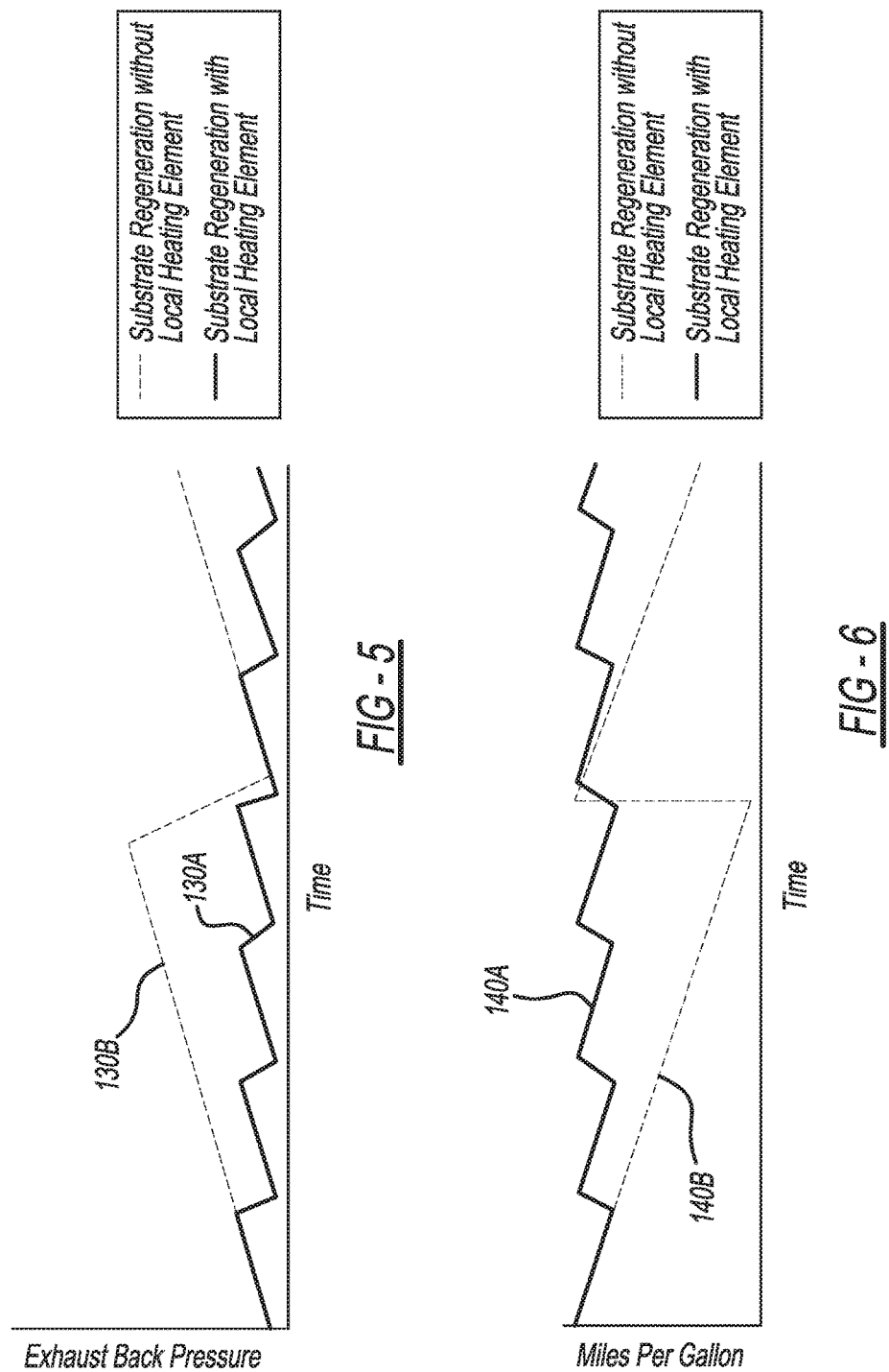

| Estimated Thermal Transfer Coefficient for Exemplary Substrate | $[(.5 \times 3)+(.25 \times 71.8)+(.2 \times 71.6)+(.05 \times 150)] = 41.27$ | | | | |
|---|---|---|---|---|---|
| | Exemplary Substrate Composition | | | | |
| | Material Name | Atomic Symbol | Automic Number | Thermal Transfer Coefficient W/(m-k) | Melting Point °C |
| Silicate Mineral - | Cordierite | $Mg_2 Al_4 Si_5 O_{18}$ | N/A | 1.6 to 3** | 1435 |
| Metal - | Rhodium | Rh | 45 | 150 | 1963 |
| Metal - | Platinum | Pt | 78 | 71.6 | 1768 |
| Metal - | Palladium | Pd | 46 | 71.8 | 1555 |
| | Exemplary Thermal Energy Distributors | | | | |
| | Material Name | Atomic Symbol | Automic Number | Thermal Transfer Coefficient W/(m-k) | Melting Point °C |
| Metal - | Niobium | Nb | 41 | 54 | 2468 |
| Metal - | Molybdenum | Mo | 42 | 138 | 2610 |
| Metal - | Technetium | Tc | 43 | 51 | 2157 |
| Metal - | Ruthenium | Ru | 44 | 117 | 2334 |
| Metal - | Tungsten | W | 74 | 173 | 3422 |

EMISSIONS CONTROL SUBSTRATE

FIELD

The present disclosure relates to emissions control substrates, such as particulate matter filter substrates and catalytic converter substrates.

BACKGROUND

This section provides background information related to the present disclosure, which is not necessarily prior art.

Emissions control substrates are often used with engine exhaust systems to treat exhaust before it is released into the atmosphere. For example, a catalytic converter substrate is often used with automobile exhaust systems to catalyze a redox reaction, thereby converting CO into $CO_2$, and converting $NO_x$ into $N_2$ and $O_2$. A particulate filter substrate is often used to treat exhaust gas from an engine, such as a diesel engine, by filtering particulate matter out of the exhaust. While existing emissions control substrates are suitable for their intended use, they are subject to improvement. The present teachings provide for emissions control substrates that address various needs in the art, and provide numerous unexpected and advantageous results.

SUMMARY

This section provides a general summary of the present teachings, and is not a comprehensive disclosure of the full scope or all of the features of the present teachings. The present teachings provide for emissions control substrates, heaters for emissions control substrates, and methods for heating emissions control substrates. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 5 is a chart of exhaust back pressure over time for a substrate without a local heating element, and for a substrate with a local heating element;

FIG. 6 is a chart of miles per gallon over time of a vehicle having an emissions control substrate according to the present teachings that is locally heated, as compared to an emissions control substrate that is heated solely by engine exhaust;

FIG. 11 is a chart including various thermal energy distributors and properties thereof.

Corresponding reference numerals indicate corresponding parts throughout the several views of the drawings.

DETAILED DESCRIPTION

Example embodiments will now be described more fully with reference to the accompanying drawings.

Figure 1:
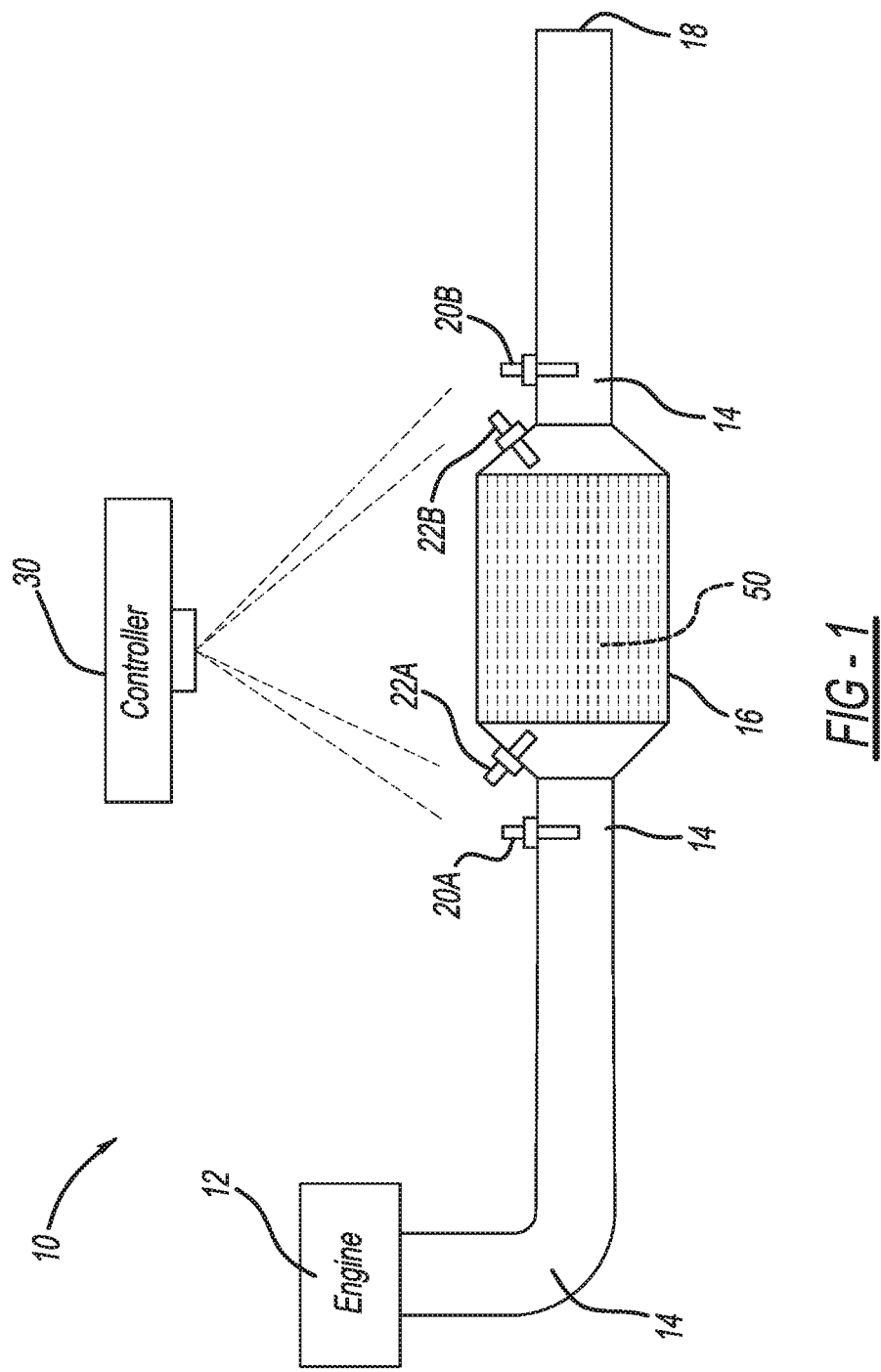
FIG. 1 illustrates an exhaust system including an emissions control substrate according to the present teachings.

With initial reference to FIG. 1, an exhaust system is generally illustrated at reference numeral 10. The exhaust system 10 is suitable for treating exhaust from any suitable engine 12, such as an internal combustion engine. The engine 12 may be a diesel engine or any other suitable internal combustion engine. The engine 12 may be that of any suitable vehicle, such as any suitable passenger vehicle, mass transit vehicle, military vehicle, watercraft, aircraft, or construction vehicle, for example. The engine 12 may also be an engine apart from a vehicle, such as an engine for a generator or any suitable building system, for example.

Extending from the engine 12 is an exhaust conduit 14, which can be any suitable conduit, such as piping, configured to direct exhaust away from the engine. The exhaust conduit 14 connects the engine 12 to a substrate chamber 16 housing an emissions control substrate 50. From the substrate chamber 16, the exhaust conduit 14 extends to an exhaust outlet 18, which may be at or proximate to a tailpipe of a vehicle, for example. The substrate 50 can be any suitable emissions control substrate, such as a particulate matter filter (including a diesel particulate filter) and/or catalytic converter, as explained further herein. The substrate 50 can include any suitable catalyst, such as a catalyst configured to facilitate regeneration of the particulate matter filter, or a catalytic converter catalyst configured to catalyze a redox reaction, thereby converting CO into $CO_2$, and converting $NO_x$ into $N_2$ and $O_2$, for example. Although FIG. 1 illustrates only a single substrate 50, the exhaust system may include multiple substrates, each one of which may be particulate matter filter and/or a catalytic converter. For example, an additional catalytic converter substrate may be positioned downstream or upstream of the substrate 50 configured as a catalytic converter.

The exhaust system 10 includes a plurality of sensors spaced apart at any suitable locations about the exhaust system 10 for measuring various parameters, such as temperature and/or pressure of exhaust emitted from the engine 12, temperature of an emissions control substrate 50 (such as a substrate configured as a catalytic converter and/or a particulate matter filter), and/or temperature of a catalyst of the substrate 50. For example, sensor 20A can be located at a position along the exhaust conduit 14 that is upstream of substrate chamber 16, which houses substrate 50, relative to exhaust flowing through the exhaust conduit 14 from the engine 12. Sensor 20B can be arranged along the exhaust conduit 14 downstream from the substrate chamber 16 relative to exhaust flowing through the substrate chamber 16 from the engine 12. The sensors 20A and 20B are suitable for measuring the pressure and/or temperature of exhaust within the exhaust conduit 14 outside of the substrate chamber 16. Temperature and/or pressure of exhaust at the substrate 50 within the substrate chamber 16 can be measured with the sensors 22A and 22B, which may be located at the substrate chamber 16 on opposite sides thereof. The sensors 22A and/or 22B can be arranged to also measure the temperature of the substrate 50 itself and/or the temperature of a catalyst of the substrate. The sensors 20A, 20B, 22A, and 22B can be any suitable sensors configured to measure exhaust temperature and/or exhaust pressure, as well as temperature of the substrate 50 and/or temperature of a catalyst included with the substrate 50.

The exhaust system 10 further includes a controller 30. The controller 30 may be any suitable controller configured to receive inputs from the sensors 20A, 20B, 22A, and 22B, and operate a heating element (such as heating element 60 or heating element 80 described herein) for heating the substrate 50 when predetermined conditions are present in accordance with the present teachings, as described herein. The controller 30 includes any suitable processor hardware configured to execute code configured to provide the features of the controller 30 described herein, and memory hardware that stores code for execution by the processor hardware.

Figure 2:
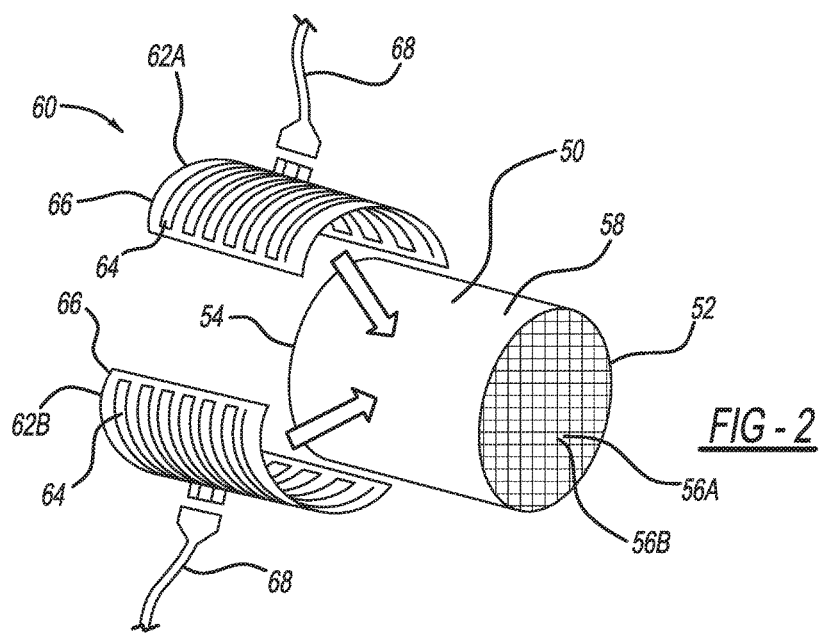
FIG. 2 is a perspective view of a heating device or element according to the present teachings for an emissions control substrate.

With reference to FIG. 2, the emissions control substrate 50, which can be configured as a catalytic converter and/or a diesel particulate filter, will now be described in further detail. The emission control substrate 50 generally includes a first end 52 and a second end 54, which is opposite to the first end 52. A plurality of channels 56A are defined within the emissions control substrate 50 by sidewalls 56B. The sidewalls 56B and the channels 56A defined thereby extend between the first end 52 and the second end 54. The substrate 50 has an exterior surface 58, which can be round or have any other suitable shape.

The substrate 50 and the sidewalls 56B can be made of any suitable material, such as any suitable ceramic material, including cordierite. The sidewalls 56B can be made of cordierite, or any other suitable exhaust-permeable materials. The substrate 50 can be configured as a particulate matter filter (such as a diesel particulate matter filter) and/or a catalytic converter. As a particulate matter filter, the sidewalls 56B of the channels 56A are configured to trap particulate matter present in exhaust produced by the engine 12, such as unburned hydrocarbons, as the exhaust passes through the sidewalls 56B of the channels 56A.

The sidewalls 56B of the channels 56A can include a catalyst. When the substrate 50 is configured as a particulate matter filter, the sidewalls 56B can include any catalyst suitable to facilitate regeneration of the substrate 50, such as by oxidizing particulate matter that has accumulated on or in the sidewalls 56B. Exemplary catalysts include, but are not limited to, platinum, palladium, rhodium, cerium, iron, manganese, nickel, and copper. When the substrate 50 is configured as a catalytic converter, the catalyst can be any catalyst suitable for catalyzing a redox reaction to treat toxic pollutants and exhaust gas passing through the substrate 50 prior to release of the exhaust to the atmosphere. For example, the catalyst can be any catalyst suitable to convert carbon monoxide, hydrocarbons, and nitrogen oxides to carbon dioxide, water vapor, and nitrogen gas, for example.

The present teachings further provide for any suitable heating element for heating the substrate 50, and/or any catalyst thereof. For example and as illustrated in FIG. 2, the present teachings provide for a heating element 60 configured to apply heat to the exterior surface 58 of the substrate 50. The heating element 60 can be any suitable heating element, such as any suitable ceramic heater. In the example illustrated, the heating element 60 includes a first portion 62A and a second portion 62B, each of which is curved in a manner corresponding to the exterior surface 58 of the substrate 50. The first and second portions 62A and 62B can be unitary, however, or separated into more than two portions. A plurality of electrodes 64 are spaced apart about a base 66, which can be a flexible ceramic plate, for example. The electrodes 64 are energized by electrical current generated by any suitable current source, and conducted to the heating element 60 with connector wire 68, or in any other suitable manner.

Figure 3:
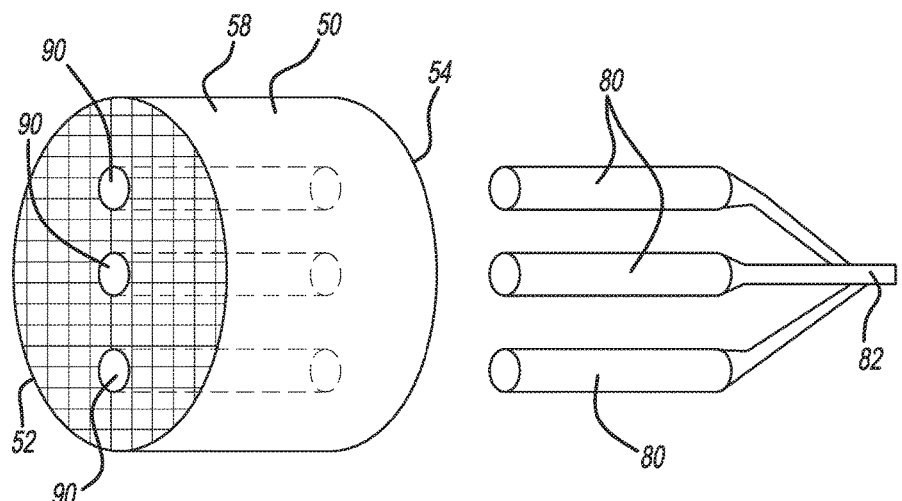
FIG. 3 is a perspective view of another heating device or element according to the present teachings for an emissions control substrate.

FIG. 3 illustrates another heating element 80 according to the present teachings for heating the substrate 50. The heating element 80 is configured to be inserted within an interior of the substrate 50, such as into one or more bores 90 within the substrate 50. The bores 90 can be through bores extending between the first and second ends 52 and 54. The heating element 80 can be any suitable heating element configured to be inserted within the bores 90. For example, the heating element 80 can include rolled or flat ceramic plates printed with electrodes, which can be similar to the electrodes 64. Connector wires 82 are configured to conduct current to the electrodes from any suitable current source. The heating element 60 advantageously provides isostatic canning strength to the substrate 50, and acts as a thermal battery to prevent heat from escaping out from within the substrate 50, which can prevent the substrate 50 from cooling down too quickly.

With continued reference to FIGS. 1-3, and additional reference to FIG. 4, a method for heating the emissions control substrate 50 with any suitable heating element, such as the heating element 60 or the heating element 80, is illustrated and will now be described. The method 110 will be described as a method for heating the substrate 50 when configured as a particulate matter filter, but can be used to heat any suitable substrate under any suitable conditions. With initial reference to block 112, pressure of exhaust gas present in the exhaust system 10 is measured at any suitable location of the exhaust system 10 spaced apart from the substrate chamber 16 and the substrate 50. For example, the pressure can be measured using the sensor 20A, which is upstream from the substrate chamber 16 relative to exhaust flowing from the engine 12, and measured with sensor 20B, which is downstream from the substrate chamber 16. At block 114, pressure drop of exhaust is measured at the substrate 50. The pressure drop at the substrate 50 can be measured with, for example, the sensors 22A and 22B, which are each arranged in the substrate chamber 16 on opposite sides of the substrate 50. The controller 30 is configured to receive inputs from the sensors 20A, 20B, 22A, and 22B, process the inputs, and determine the pressure drop in the exhaust system (block 112) and at the substrate 50 (block 114).

If the controller 30 determines that the pressure drops measured at blocks 112 and 114 are both equal to or less than a predetermined target pressure drop at block 116A, the controller 30 will not activate the heating element (such as heating elements 60 or 80) for heating the substrate 50. The controller will then proceed to blocks 112 and 114, where the controller 30 will continue to measure the pressure within the exhaust system 10 generally, and at the substrate chamber 16, in order to identify pressure drops that may be greater than the target pressure drop. The target pressure drop may be the pressure drop resulting from back pressure caused by the buildup of particulate matter at the sidewalls 56B of channels 56A in an amount exceeding an acceptable level.

In order to reduce the back pressure and burn off the captured particulate matter, the catalyst of the substrate 50 configured as a particulate matter filter promotes an exothermic reaction, which burns off the captured particulate matter and reduces back pressure. The catalyst promotes the exothermic reaction when heated to a temperature greater than a lightoff temperature, typically by exhaust from the engine 12. Undesirably, with current particulate matter substrates the engine 12 must be operated for a period of time before the exhaust is warm enough to raise the temperature of the catalyst above the lightoff temperature. This is particularly disadvantageous because 90% of vehicle emissions often occur within the first 30 seconds of engine operation. The heating element according to the present teachings, such as heating elements 60 and 80, advantageously provide additional heat to the substrate 50 and the catalyst thereof, which allows the catalyst to reach its lightoff temperature sooner, thereby decreasing release of emissions to the atmosphere and reducing the need to rely on the engine to keep the substrate 50 and catalyst thereof warm, which increases fuel economy. Maintaining the catalyst of the substrate 50 above its lightoff temperature will also reduce the amount of particulate matter that reaches any additional emissions control substrates that may be positioned downstream of the substrate 50, thereby extending the useful life of any downstream emissions control substrates.

Figure 4:
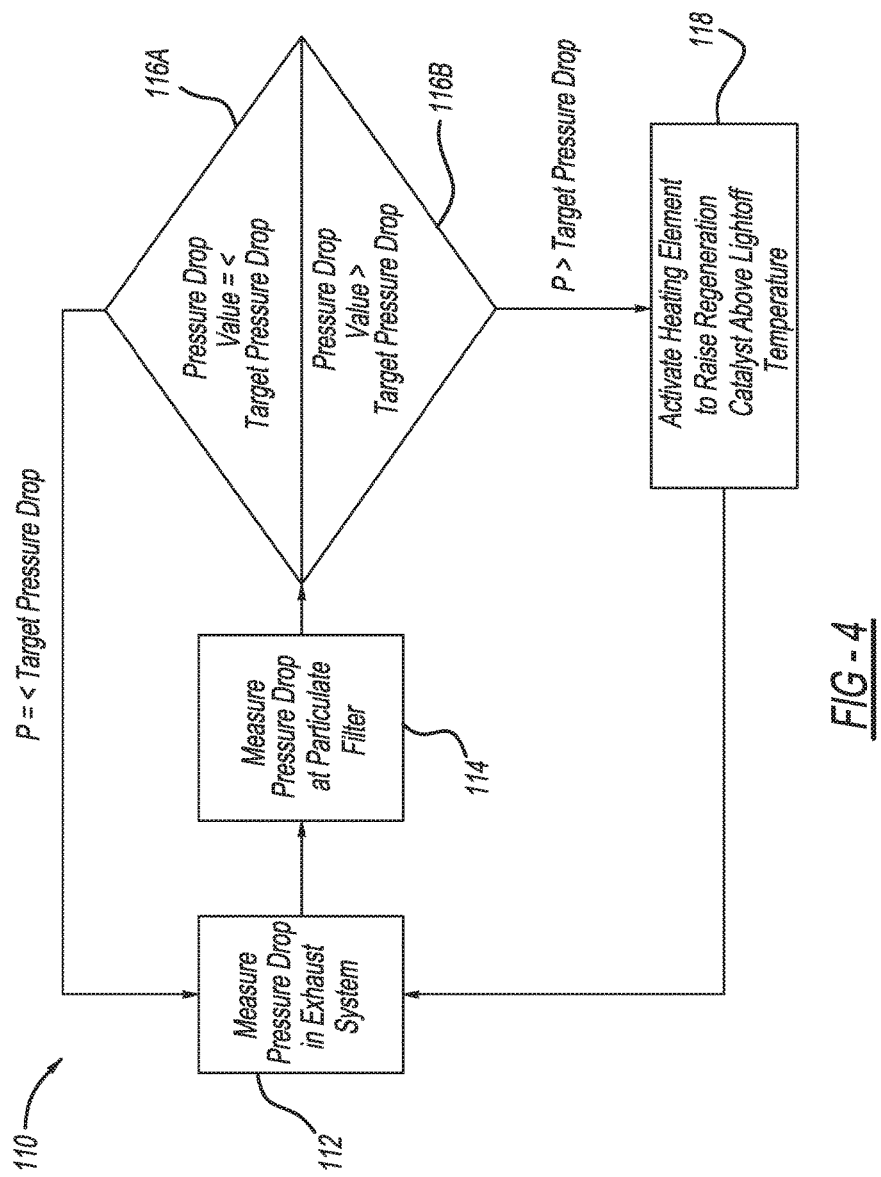
FIG. 4 illustrates a method according to the present teachings for operating a heating device or element for a particulate matter filter substrate.

If at block 116B of FIG. 4 the controller 30 identifies that the pressure drop at block 112 and/or block 114 is greater than a target pressure drop, the controller proceeds to block 118. At block 118 the controller 30 activates the heating element, such as heating element 60 or 80, in order to heat the substrate 50 to raise the temperature of the catalyst thereof above its lightoff temperature. The heated catalyst will thus promote the exothermic reaction to burn off the particulate matter captured in the substrate 50, thereby reducing back pressure at the substrate chamber 16 and throughout the exhaust system 10.

Use of the heating element 60 or the heating element 80, for example, to raise the temperature of the regeneration catalyst to above its lightoff temperature provides numerous advantageous. For example, the heating element 60 is flexible, provided as two separate portions 62A/62B, and curved to fit the exterior surface 58 of the substrate 50. The heating element 60 is thus able to withstand any thermal shock to either the substrate 50 or the heating element 60, which may result due to the substrate 50 expanding when heated. Similarly, by positioning the heating elements 80 within the bores 90 of the substrate 50, the substrate 50 is able to freely expand in response to being heated without damaging the heating elements 80.

By heating the regeneration catalyst of the substrate 50 using the heating elements 60/80, the engine 12 need not spend additional fuel to generate heat by way of exhaust, and transfer the heat through the exhaust system 10 to the substrate 50, which can decrease fuel economy. Because the heating elements 60/80 apply heat directly to the substrate 50, advantageously little or no heat is lost during heat transfer, which improves efficiency. Furthermore, the heating elements 60 and 80 are able to heat the regeneration catalyst more quickly to its lightoff temperature, thereby allowing the substrate 50 to undergo regeneration at engine start or soon thereafter, thus improving the efficiency of the substrate 50 with respect to its ability to filter particulate matter out of exhaust passing through the substrate 50. Furthermore, heating the substrate 50 with the heating elements 60/80 reduces release of unnecessary exhaust into the environment.

Some of the advantages of the heating elements according to the present teachings, such as heating elements 60 and 80, are illustrated in FIGS. 5 and 6. With reference to FIG. 5, the line plotted at reference numeral 130A illustrates the exhaust back pressure measured in the exhaust system 10 over time when regeneration of the substrate 50 is facilitated using the heating elements according to the present teachings (such as heating elements 60 and 80) to raise the temperature of the regeneration catalyst above its lightoff temperature. The line plotted at reference numeral 130B represents exhaust back pressure over time when the heating elements according to the present teachings are not used, and thus the substrate 50 and the regeneration catalyst is heated solely by engine exhaust. Advantageously, use of the heating elements according to the present teachings maintains exhaust back pressure at a lower rate consistently over time as compared to substrates that do not include the heating elements according to the present teachings, which indicates that using the heating elements according to the present teachings (such as heating elements 60/80) allows the substrate 50 to continuously regenerate itself and filter a maximum amount of particulate matter from exhaust. In contrast, when the heating elements according to the present teachings are not used, periods of increased exhaust backpressure are realized, during which the ability of the substrate to filter particulate matter may be decreased.

FIG. 6 illustrates the advantages with respect to fuel economy of using the heating elements according to the present teachings, such as the heating elements 60 and 80. Specifically, the plotted line at reference numeral 140A represents the miles per gallon of a vehicle including the exhaust system 10 having the heating elements according to the present teachings, such as elements 60 or 80. The line plotted at reference numeral 140B illustrates the miles per gallon of a vehicle including an exhaust system without the heating elements according to the present teachings. Thus use of the heating elements according to the present teachings, such as the heating elements 60 or 80, provides for a fuel economy that is consistently higher than realized when heating elements according to the present teachings are not used.

Figure 7:
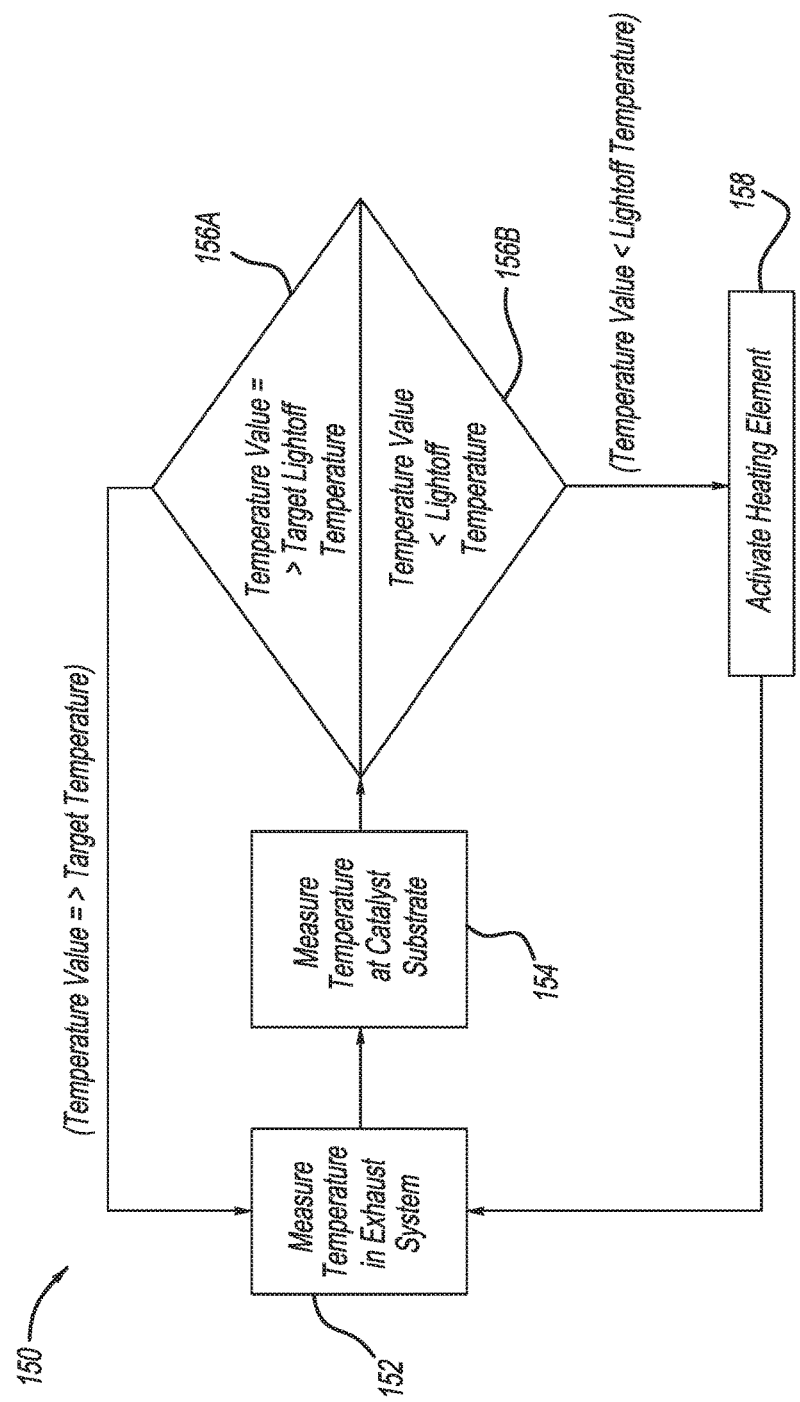
FIG. 7 illustrates a method according to the present teachings for operating a heating device or element for a catalytic converter substrate.

With reference to FIG. 7, a method according to the present teachings for heating the substrate 50 when the substrate 50 is configured as a catalytic converter is illustrated at reference numeral 150. At block 152, temperature of exhaust within the exhaust system 10 is measured in any suitable manner, such as with the sensors 120A and/or 120B. At block 154, temperature of the substrate 50 and/or the catalytic converter catalyst thereof is measured in any suitable manner, such as with sensors 22A and/or 22B. The controller 30 measures the temperature at blocks 152 and 154 by receiving inputs from the sensors 20A, 20B, 22A, and/or 22B. The controller 30 compares the measured temperatures to the lightoff temperature of the catalyst at the sidewalls 56B of the substrate 50. Monitoring the temperature of the exhaust at the substrate 50 as well as apart from the substrate 50 provides a number of advantages. For example, the rich or lean condition of the exhaust may have an impact on the temperature of the substrate due to how much unburned fuel is in the exhaust. The controller 30 thus monitors the temperature of the substrate 50, temperature of exhaust away from the substrate 50, and the rich/lean condition of the exhaust, and based on these temperatures manages how much fuel to air should be burned in the cylinders in order to keep the temperature high and not waste fuel in order to achieve enhanced fuel economy.

At block 156A, if the temperature measured at block 152 and/or block 154 is equal to or greater than the lightoff temperature of the catalyst, the controller does not activate the heating element, such as the heating elements 60/80, for example, and returns to blocks 152 and 154 where the temperature is measured again. If at block 156B the controller determines that the temperature measured at blocks 152 and/or 154 is less than the lightoff temperature of the catalytic converter catalyst, the controller proceeds to block 158. At block 158 the controller 30 activates the heating element, such as the heating element 60 or 80, in order to raise the temperature of the substrate 50 and the catalyst thereof to above the lightoff temperature of the catalyst. Above the lightoff temperature, the catalyst is effective to treat exhaust passing through the substrate 50 by catalyzing a redox reaction, thereby converting CO into $CO_2$, and converting $NO_x$ into $N_2$ and $O_2$ in order to break down exhaust into components that are suitable for release into the environment.

The method 150 can be performed before or after ignition of the engine 12. For example, when a user activates his or her remote start to start his or her vehicle remotely, the temperature measurements at blocks 152 and 154 can be performed before the engine is actually ignited. If at block 156B the controller determines that the temperature measured at blocks 152 and/or 154 is less than the lightoff temperature of the catalytic converter catalyst, the controller proceeds to block 158. At block 158 the heating element, such as heating element 60/80, can be activated prior to engine start and the controller 30 can be configured to not start the engine until the catalytic converter catalyst has reached a temperature that is equal to or greater than its lightoff temperature. Therefore, when the engine is started, the catalyst will be immediately effective to catalyze the redox reduction, which will reduce the possibility of untreated exhaust being released to the atmosphere at engine start before the catalyst reaches its lightoff temperature.

Use of the heating elements according to the present teachings, such as the heating elements 60 or 80, provides numerous advantages. For example, the heating element 60 applies heat to the exterior surface 58 of the substrate 50, which is where heat most readily escapes from the substrate 50, in order to most efficiently heat the substrate 50 and the catalyst thereof. The heating element 60 thus advantageously also serves as an insulator. For example, the heating element 60, can absorb thermal energy released from the substrate 50, and transfer the thermal energy back to the substrate 50 regardless of whether current is supplied to the heating element 60 or not. As explained above, the heating element 60 can also serve to apply an isostatic force to the exterior surface 58. The heating elements 60 and 80 also provide a local heat source at the substrate 50, which frees the engine 12 from having to consume additional fuel to generate heat by way of exhaust, and transfer the heat through the exhaust conduit 14 to the substrate 50.

Figure 8:
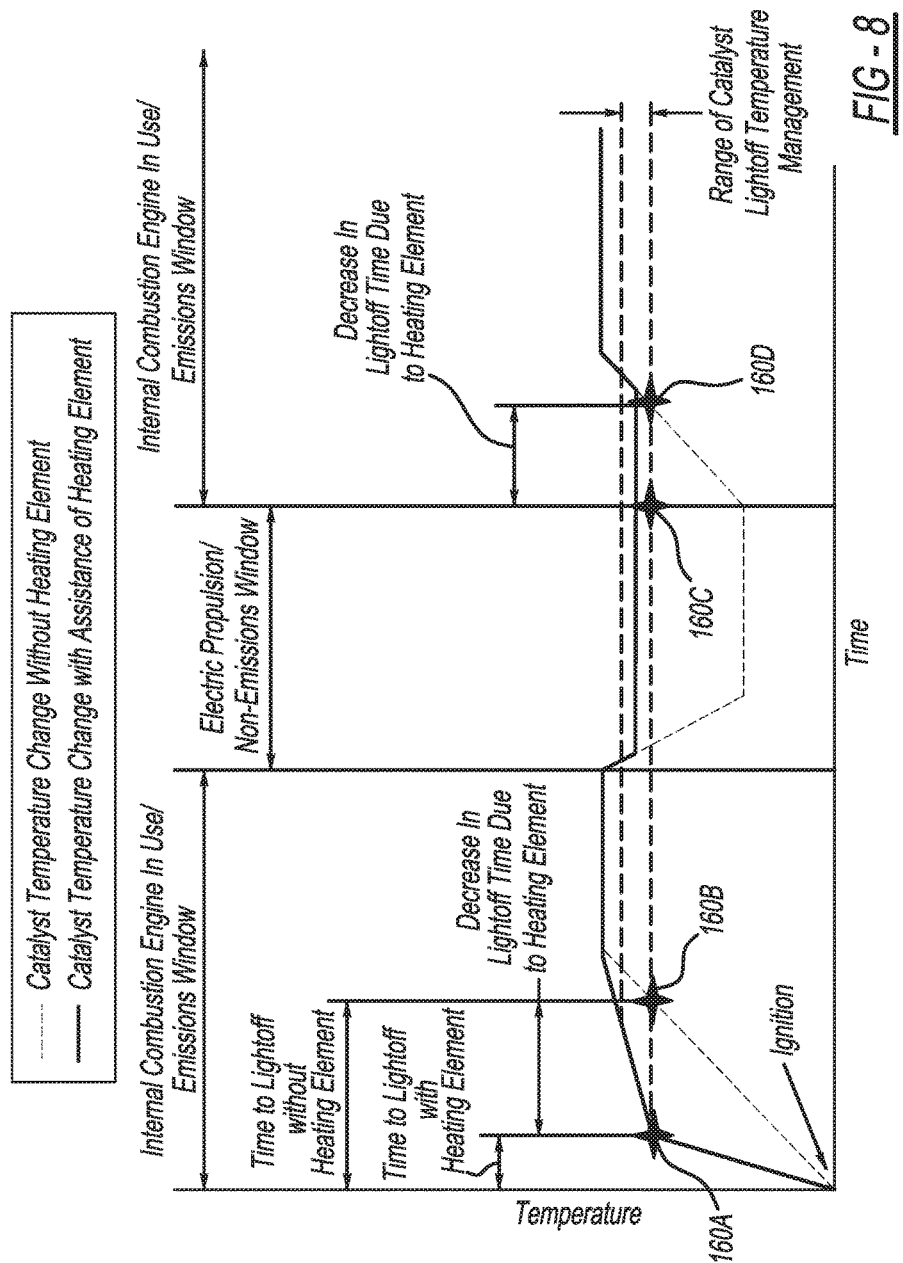
FIG. 8 is a chart illustrating temperature over time of a catalyst for an emissions control substrate when heated by a local heater according to the present teachings, as compared to when heated solely by engine exhaust.

FIG. 8 illustrates advantages of using the heating elements according to the present teachings, such as the heating elements 60 and 80, with a hybrid vehicle. FIG. 8 illustrates temperature of the catalytic converter catalyst of the substrate 50 at various times during operation of a vehicle equipped with the exhaust system 10 including the substrate 50 having a heating element according to the present teachings, such as the heating element 60 or the heating element 80. Subsequent to ignition of the engine 12, use of the heating element according to the present teachings results in catalyst lightoff at 160A, which is well prior to catalyst lightoff without one of the heating elements according to the present teachings, which occurs at 160B. This initial catalyst lightoff takes place during an emissions window in which the internal combustion engine 12 is in use.

During a non-emissions window in which the vehicle is operating under electric propulsion and the engine 12 is either off or operating at a very low RPM rate, temperature of the catalytic converter catalyst will significantly drop when the substrate 50 is without a heating element according to the present teachings, such as heating element 60 or 80. In contrast, during the non-emissions window use of heating elements according to the present teachings, such as heating elements 60/80, will keep the temperature of the catalyst higher. This allows the catalyst to be at its lightoff temperature as soon as the internal combustion engine 12 is again in use (see catalyst lightoff at 160C), which is well prior to catalyst lightoff at 160D for substrates without a heating element.

Figure 9:
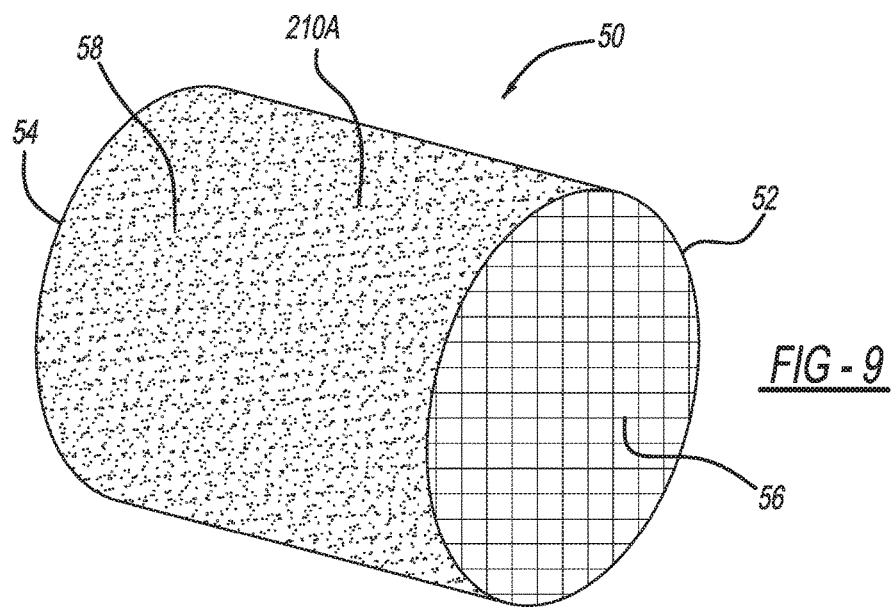
FIG. 9 is a perspective view of an emissions control substrate coated with a thermal energy distributor in accordance with the present teachings.
Figure 10:
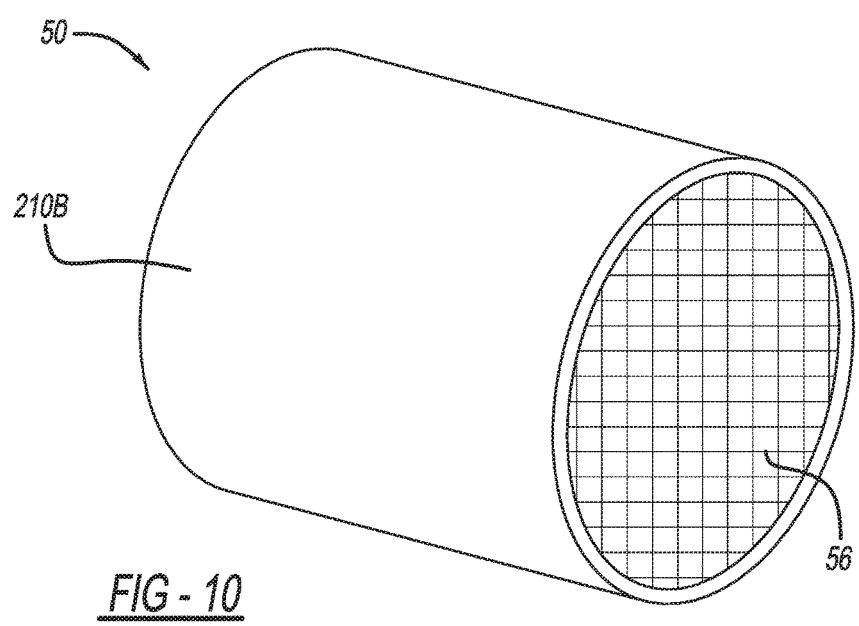
FIG. 10 is a perspective view of an emissions control substrate including another thermal energy distributor in accordance with the present teachings.

With reference to FIG. 9, the substrate 50 can advantageously include a thermal energy distributor 210A. The thermal energy distributor 210A can be any suitable coating at the exterior surface 58 of the substrate 50 configured to distribute heat across the exterior surface 58. In addition to being provided as a coating 210A, the thermal energy distributor may be any suitable shell, plate, plating, foil, etc. provided as a cover seated over the exterior surface 58, as illustrated in FIG. 10 at reference numeral 210B, for example. The thermal energy distributor 210A/210B advantageously is a static device, which requires no additional power to operate. The thermal energy distributor 210B provided as a shell, cover, plating, or any other suitable exterior casing, advantageously provides isostatic canning strength to the substrate 50.

The thermal energy distributor 210A/210B can be any suitable material having a thermal transfer coefficient (such as a first thermal transfer coefficient) that is greater than a thermal transfer coefficient (such as a second thermal transfer coefficient) of the substrate 50. The thermal energy distributor 210A/210B advantageously conveys thermal energy across and along the length of the exterior surface 58 faster than a conventional catalyst. Furthermore, the thermal energy distributor 210A/210B distributes thermal energy across and along the length of the exterior surface 58 more evenly. This advantageously reduces lightoff and re-lightoff time, as well as regeneration time, by distributing thermal energy along and across the exterior surface 58 faster because the coefficient of energy of the thermal energy distributor 210A/210B is higher than that of the remainder of the substrate 50. If a heating element, such as heating element 60, is arranged on top of the thermal energy distributor 210A/210B, the thermal energy distributor 210A/210B will increase the efficiency of the heat stored and transferred into and out of the substrate 50. The thermal energy distributor 210A/210B advantageously facilitates heating the entire substrate 50, instead of just the first end 52 thereof, as exhaust gas typically does.

The thermal energy distributor 210A/210B can be any suitable material, such as any suitable metal, which has a thermal transfer coefficient that is higher than a combined thermal transfer coefficient of the substrate 50 and any catalyst included therewith. For example and with reference to FIG. 11, an exemplary substrate 50 includes cordierite, rhodium, platinum, and palladium. Based on the thermal transfer coefficient of each one of these materials listed in FIG. 11, and the relative amounts of these materials present in the exemplary substrate 50, the estimated thermal transfer coefficient for the exemplary substrate 50 is 41.27 (see calculation at top of FIG. 11). Therefore, any suitable material, such as any suitable metal, having a thermal transfer coefficient that is greater than 41.27 will be a suitable thermal energy distributor 210A/210B for the exemplary substrate 50, as long as the material has a melting point that is greater than the melting points of the materials of the substrate 50. For example and as illustrated in FIG. 11, suitable energy distributors 210A/210B include at least any one of the following: niobium, molybdenum, technetium, ruthenium, or tungsten.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An emissions control assembly comprising:
   a substrate defining a plurality of channels that are configured to receive engine exhaust gas passing through the substrate, the plurality of channels define first openings at a first end of the substrate that is an upstream end through which exhaust gas enters the substrate and second openings at a second end of the substrate that is a downstream end through which exhaust gas exits the substrate, the first end is opposite to the second end, an exterior surface of the substrate extends between the first end and the second end;
   a heating element configured to heat the substrate, the heating element is at the exterior surface of the substrate, the heating element includes a plurality of electrodes spaced apart about a flexible ceramic plate that is curved to match the exterior surface of the substrate;
   wherein the flexible ceramic plate is to retain heat within the substrate, the flexible ceramic plate includes a first portion covering a first half of the exterior surface of the substrate, and a second portion covering a second half of the exterior surface of the substrate;
   a sensor for measuring an exhaust gas temperature; and
   a controller configured to activate the heating element when the measured temperature of the exhaust gas is less than a target temperature of the exhaust gas.

2. The emissions control assembly of claim 1, wherein the substrate is a particulate matter filter emissions control substrate.

3. The emissions control assembly of claim 1, wherein the substrate is a catalytic converter emissions control substrate.

4. An emissions control assembly comprising:
   a substrate defining a plurality of channels that are configured to receive engine exhaust gas passing through the substrate, the plurality of channels define first openings at a first end of the substrate that is an upstream end through which exhaust gas enters the substrate and second openings at a second end of the substrate that is a downstream end through which exhaust gas exits the substrate, the first end is opposite to the second end, an exterior surface of the substrate extends between the first end and the second end;

a thermal energy distributor at the exterior surface of the substrate, the thermal energy distributor is configured to distribute heat across the exterior surface, the thermal energy distributor has a first thermal transfer coefficient that is greater than a second thermal transfer coefficient of the substrate, the thermal energy distributor includes a plurality of electrodes spaced apart about a flexible ceramic plate that is curved to match the exterior surface of the substrate;

a heating element arranged on top of the thermal energy distributor configured to heat the substrate, the heating element is at the exterior surface of the substrate, the heating element includes a plurality of electrodes spaced apart about a flexible ceramic plate that is curved to match the exterior surface of the substrate;

wherein the flexible ceramic plate is to retain heat within the substrate, the flexible ceramic plate includes a first portion covering a first half of the exterior surface of the substrate, and a second portion covering a second half of the exterior surface of the substrate;

a sensor for measuring an exhaust gas temperature; and a controller configured to activate the heating element when the measured temperature of the exhaust gas is less than a target temperature of the exhaust gas.

5. The emissions control assembly of claim 4, wherein the thermal energy distributor includes at least one of niobium, molybdenum, technetium, ruthenium, and tungsten.

6. The emissions control assembly of claim 4, wherein the substrate includes cordierite, rhodium, platinum, and palladium.

7. The emissions control assembly of claim 6, wherein the second thermal transfer coefficient is 41.27 W/(m-k).

8. A method for heating a substrate of an emissions control assembly comprising:

measuring pressure of exhaust gas present in an exhaust system via a pressure sensor, at least one of proximate to and distal to an emissions control substrate of the exhaust system when the substrate is a particulate matter filter;

measuring temperature of exhaust gas within the exhaust system and temperature of the substrate when the substrate is a catalytic converter via at least one temperature sensor;

when the substrate is the particulate matter filter, activating a heating element configured to heat the substrate when the measured pressure is greater than a predetermined pressure; and when the substrate is the catalytic converter, activating the heating element when the measured temperature of exhaust gas is less than a lightoff temperature of a catalyst of the catalytic converter;

wherein the substrate defines a plurality of channels that are configured to receive engine exhaust gas passing through the substrate, the plurality of channels define first openings at a first end of the substrate that is an upstream end through which exhaust gas enters the substrate and second openings at a second end of the substrate that is a downstream end through which exhaust gas exits the substrate, the first end is opposite to the second end, an exterior surface of the substrate extends between the first end and the second end;

wherein the heating element is at the exterior surface of the substrate, the heating element includes a plurality of electrodes spaced apart about a flexible ceramic plate curved to match the exterior surface of the substrate; and wherein the flexible ceramic plate is to retain heat within the substrate, the flexible ceramic plate includes a first portion covering a first half of the exterior surface of the substrate, and a second portion covering a second half of the exterior surface of the substrate.

9. The method of claim 8, further comprising applying a thermal energy distributor to an exterior surface of the substrate, the thermal energy distributor having a first thermal transfer coefficient that is greater than a second thermal transfer coefficient of the substrate.

* * * * *